United States Patent
Park et al.

(10) Patent No.: US 9,131,267 B2
(45) Date of Patent: Sep. 8, 2015

(54) APPARATUS AND METHOD OF PORTABLE TERMINAL FOR DUAL DISPLAY OF BROADCASTING RECEIVER BY HDMI SIGNAL

(71) Applicant: Samsung Electronics Co. Ltd., Suwon-si, Gyeonggi-do (KR)

(72) Inventors: Sang-Mi Park, Suwon-si (KR); Hyun-Ho Park, Seoul (KR); Woo-Jong Yoo, Hwaseong-si (KR); Ju-Pyo Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 121 days.

(21) Appl. No.: 13/666,200

(22) Filed: Nov. 1, 2012

(65) Prior Publication Data
US 2013/0152149 A1  Jun. 13, 2013

(30) Foreign Application Priority Data

Dec. 12, 2011  (KR) .................... 10-2011-0132882

(51) Int. Cl.
| | |
|---|---|
| H04N 7/18 | (2006.01) |
| H04N 21/4363 | (2011.01) |
| H04N 21/41 | (2011.01) |
| H04N 21/4367 | (2011.01) |
| H04N 21/462 | (2011.01) |
| H04N 21/4623 | (2011.01) |
| H04N 21/482 | (2011.01) |

(52) U.S. Cl.
CPC ..... *H04N 21/43632* (2013.01); *H04N 21/4126* (2013.01); *H04N 21/4367* (2013.01); *H04N 21/4622* (2013.01); *H04N 21/4623* (2013.01); *H04N 21/482* (2013.01)

(58) Field of Classification Search
None
See application file for complete search history.

(56) References Cited

U.S. PATENT DOCUMENTS

| | | | |
|---|---|---|---|
| 7,548,586 B1 | 6/2009 | Mimar | |
| 8,208,786 B2 * | 6/2012 | Tan et al. | 386/232 |
| 2006/0095638 A1 | 5/2006 | Unger | |
| 2007/0091122 A1 * | 4/2007 | Nagano et al. | 345/629 |
| 2007/0232132 A1 | 10/2007 | Ling et al. | |
| 2008/0008470 A1 | 1/2008 | Lin et al. | |
| 2008/0036854 A1 | 2/2008 | Elliott et al. | |
| 2008/0120675 A1 | 5/2008 | Morad et al. | |
| 2009/0316798 A1 | 12/2009 | Mimar | |
| 2009/0319901 A1 * | 12/2009 | Johnson et al. | 715/722 |
| 2010/0104002 A1 | 4/2010 | Kreiner et al. | |
| 2010/0110294 A1 * | 5/2010 | Oka | 348/564 |
| 2010/0194994 A1 | 8/2010 | Lee et al. | |
| 2010/0245680 A1 | 9/2010 | Tsukada et al. | |
| 2010/0328540 A1 | 12/2010 | Wu et al. | |

(Continued)

FOREIGN PATENT DOCUMENTS

| | | |
|---|---|---|
| CN | 1926855 A | 3/2007 |
| EP | 2 196 915 A1 | 6/2010 |

(Continued)

*Primary Examiner* — Oschta Montoya
(74) *Attorney, Agent, or Firm* — Jefferson IP Law, LLP

(57) ABSTRACT

An apparatus and a method of a portable terminal for dual display of a broadcasting receiver by a High Definition Multimedia Interface (HDMI) signal are provided. The method includes receiving at least one input signal from a broadcasting receiver, generating an output signal based on the received input signal, and transmitting the output signal to the broadcasting receiver so that the output signal can be output from the broadcasting receiver.

9 Claims, 5 Drawing Sheets

(56) References Cited

U.S. PATENT DOCUMENTS

2011/0063501 A1 3/2011 Bar-Niv et al.
2011/0289525 A1 11/2011 Dureau

FOREIGN PATENT DOCUMENTS

WO 2005/022377 A1 3/2005
WO 2011/145700 A1 11/2011

* cited by examiner

APPARATUS AND METHOD OF PORTABLE TERMINAL FOR DUAL DISPLAY OF BROADCASTING RECEIVER BY HDMI SIGNAL

PRIORITY

This application claims the benefit under 35 U.S.C. §119 (a) of a Korean patent application filed in the Korean Intellectual Property Office on Dec. 12, 2011 and assigned Serial No. 10-2011-0132882, the entire disclosure of which is hereby incorporated by reference.

BACKGROUND OF THE INVENTION

1. Field of the Invention

The present invention relates to an apparatus and method of a portable electronic terminal for dual display of a broadcasting receiver by a High Definition Multimedia Interface (HDMI) signal.

2. Description of the Related Art

As the functions of portable electronic terminals are developed, a technology for securing compatibility between a portable electronic terminal and a different device is being developed. For example, a portable electronic terminal and a television connect with each other and a video, which is being output in the portable electronic terminal, is displayed on a display unit of the television as it is. So, a user is able to enjoy various contents provided in the portable electronic terminal with a larger screen.

However, in the aforementioned example, the television is in a passive state of generating an output signal according to an input signal of the portable electronic terminal. In detail, the television has no function of receiving a forward of an input signal from a user and, in an active state, outputting a video and a sound (or audio). For example, in a case in which there is a call request from a different user while the user is watching movies stored on the portable terminal through the television, there is a problem in which a moving picture displayed on the television is stopped. In other words, the incoming call from the different user operatively interrupts the playback of media stored on the portable electronic terminal such that the display of the media on a television connected to the portable electronic terminal is not seamless.

Also, there is a problem in that it fails to satisfy users' various tastes because it can only output one video, which is being output to the portable terminal, to the television and cannot simultaneously output two screens to the television.

Therefore, a need exists for an apparatus and method for enabling a television receiving a forward of an input signal from a user to transmit the input signal to a portable electronic terminal, receive a forward of a High Definition Multimedia Interface (HDMI) signal from the portable electronic terminal, and control and display an output screen desired by the user itself.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages below. Accordingly, one aspect of the present invention is to provide an apparatus and method for enabling a television receiving a forward of an input signal from a user to transmit the input signal to a portable electronic terminal, receive a forward of a High Definition Multimedia Interface (HDMI) signal from the portable electronic terminal, and control and display an output screen desired by a user itself.

Another aspect of the present invention is to provide an apparatus and method for simultaneously displaying two screens on a television and enabling a user to control each screen.

A further aspect of the present invention is to provide an apparatus and method for enabling a television to receive a forward of an HDMI signal from a portable electronic terminal and display a video desired by a user, at a clear picture quality.

The above aspects are achieved by providing an apparatus and method of a portable terminal for dual display of a broadcasting receiver by an HDMI signal.

According to an aspect of the present invention, an operation method of a portable electronic terminal is provided. The method includes receiving at least one input signal from a broadcasting receiver; generating an output signal based on the received input signal, and transmitting the output signal to the broadcasting receiver so that the output signal can be output from the broadcasting receiver.

According to another aspect of the present invention, an apparatus of a portable terminal is provided. The apparatus includes a controller and a communication module. The controller analyzes an input signal received from a broadcasting receiver, and generates an output signal based on the received input signal. The communication module receives at least one input signal from the broadcasting receiver, and transmits the output signal to the broadcasting receiver so that the output signal can be output from the broadcasting receiver.

According to an aspect of the present invention, an operation method of a broadcasting receiver is provided. The method includes receiving at least one input signal, forwarding the input signal to a portable electronic terminal, receiving a High Definition Multimedia Interface (HDMI) signal from the portable electronic terminal; and outputting the received HDMI signal in a dual screen.

According to another aspect of the present invention, an apparatus of a broadcasting receiver is provided. The apparatus includes an input unit configured to receive at least one input signal, a communication module configured to forward the input signal to a portable electronic terminal, and to receive a High Definition Multimedia Interface (HDMI) signal from the portable electronic terminal, and a display unit configured receive a forward of the HDMI signal, and to output the HDMI signal in a dual screen.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will become more apparent from the following description taken in conjunction with the accompanying drawings, in which.

Throughout the drawings, it should be noted that like reference numbers are used to depict the same or similar elements, features, and structures.

DETAILED DESCRIPTION OF THE PREFERRED EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions or constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
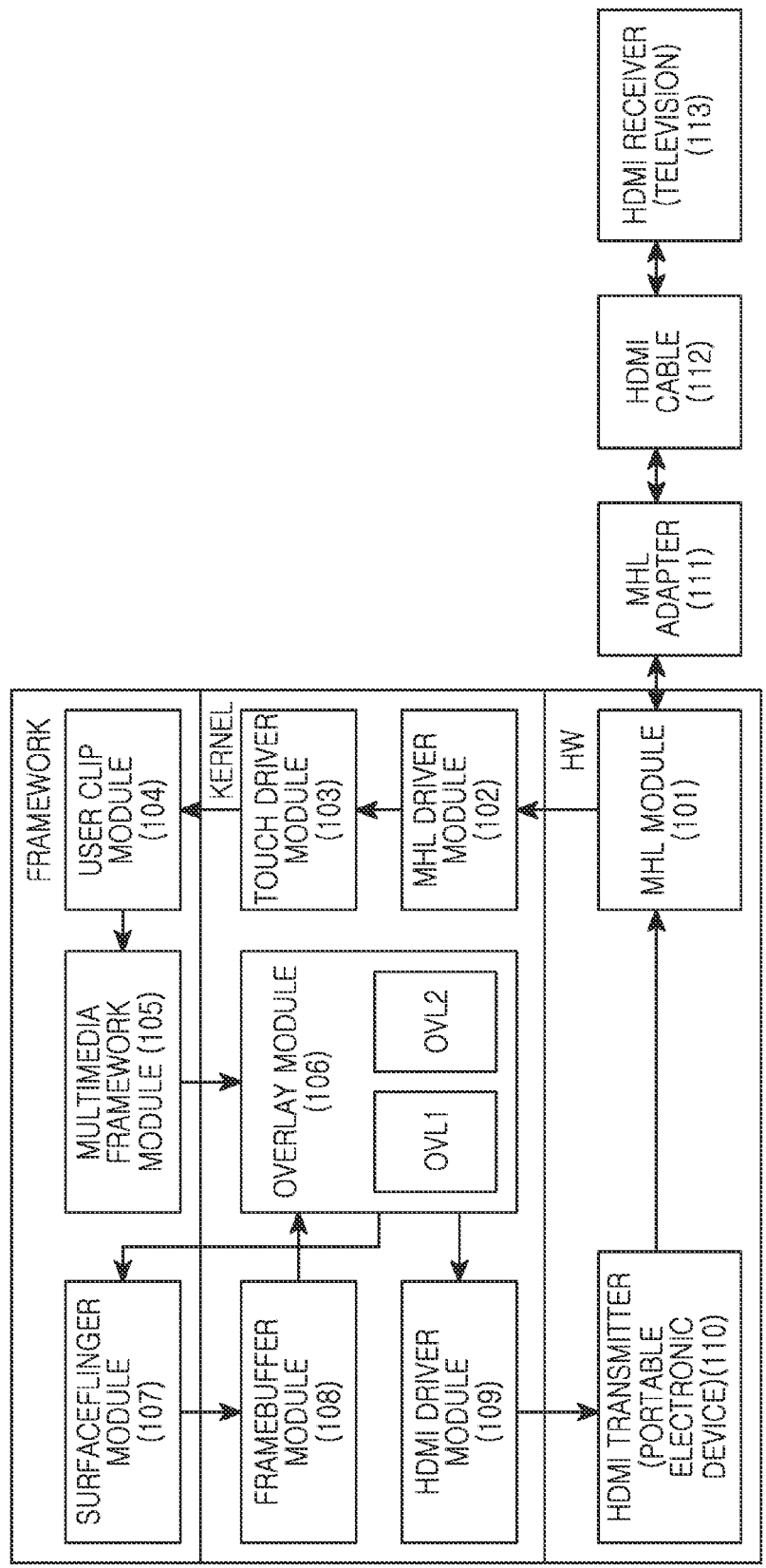
FIG. 1 is a block diagram illustrating an apparatus for transmitting and receiving a High Definition Multimedia Interface (HDMI) signal according to an exemplary embodiment of the present invention.

FIG. 1 is a block diagram illustrating an apparatus for transmitting and receiving a High Definition Multimedia Interface (HDMI) signal according to an exemplary embodiment of the present invention. A HDMI transmitter may be a portable electronic terminal, and a HDMI receiver may be a broadcasting receiver. The portable electronic terminal may be a device such as a mobile phone, a smart phone, a net book, a mobile interne device, a laptop computer, an ultra mobile PC, a tablet personal computer, a mobile telecommunication terminal, a Personal Digital Assistant (PDA) having a camera and the like herein, just to name some of the possibilities. The broadcasting receiver may be a television capable of transmitting and receiving HDMI signal.

Referring to FIG. 1, the portable electronic terminal as the HDMI transmitter can include a Mobile High Definition Link (MHL) module 101, an MHL driver module 102, a touch driver module 103, a user clip module 104, a multimedia framework module 105, a surfaceflinger module 107, a framebuffer module 108, an HDMI driver module 109, and an HDMI transmitter module 110. Also, the portable electronic terminal is connected with a broadcasting receiver 113 through an MHL adapter 111, and an HDMI cable 112.

The MHL module 101 refers to a module for receiving a forward of an input signal input from a user, from the broadcasting receiver 113. Also, though described later, the MHL module 101 is a module for converting HDMI data from the HDMI transmitter module 110 into a Universal Serial Bus (USB) signal and forwarding the USB signal to the broadcasting receiver 113.

The MHL driver module 102 is a module for receiving a forward of an input signal from the MHL module 101 and controlling the received input signal.

The touch driver module 103 is a module for receiving a forward of a controlled input signal from the MHL driver module 102, and analyzing the input signal (i.e., a signal input by a user). In detail, the touch driver module 103 is a module for analyzing the kind of the input signal input by the user to output an optimized video signal and sound signal to the broadcasting receiver 113. For example, if the broadcasting receiver 113 receives an input of an input signal displaying a movie from the user, the touch driver module 103 selects the user clip module 104 to analyze the input signal controlled in the MHL driver module 102 and to output a multimedia content (video and audio) adapted to a movie to the broadcasting receiver 113.

The user clip module 104, which is a module selected by the touch driver module 103, is a module for outputting an optimized one of a plurality of multimedia contents (video signal and sound signal) according to an input signal input by a user, to the broadcasting receiver 113. In detail, the user clip module 104 encodes a video signal and a sound signal, and encrypts the encoded signal by Digital Rights Management (DRM). For example, the user clip module 104 selected by the touch driver module 103 outputs the optimized video signal and sound signal according to the input signal. First, the user clip module 104 encodes the aforementioned video signal and sound signal, encrypts the encoded signal by the DRM, and outputs the finally encrypted signal. Here, the DRM refers to a technology for stopping unauthorized use of digital contents and preventing unauthorized reproduction and forgery.

The multimedia framework module 105 is a module for receiving a forward of an encrypted signal from the user clip module 104, decrypting the encrypted signal, and decoding the decrypted signal. That is, the multimedia framework module 105 receiving the forward of the encoded and decoded signal is for decrypting the received signal, decoding the decrypted signal, and displaying a video signal.

An overlay module 106 is a module for providing a video signal and an output signal to simultaneously provide two screens to the broadcasting receiver 113. In the related art, a portable electronic terminal constructs only one overlay module 106 and displays only one screen on a broadcasting receiver. In contrast to the related art, the portable electronic terminal according to exemplary embodiments of the present invention can construct two overlays OVL1, OVL2 in the overlay module 106 and simultaneously provide two screens to a display unit of the broadcasting receiver 113. In detail, exemplary embodiments of the present invention receive a forward of a decoded video signal and sound signal from the multimedia framework module 105, forwards the video signal and sound signal, which can be output to the broadcasting receiver 113, to the surfaceflinger module 107, receives a forward of an updated signal from the framebuffer module 108, and forwards all of a video signal and a sound signal to the HDMI driver module 109.

The surfaceflinger module 107 receives a forward of a video signal and audio signal, which can be output to the broadcasting receiver 113, from the overlay module 106.

Also, the surfaceflinger module 107 is a module for forwarding a previously stored updated video signal and audio signal to the framebuffer module 108, together with the video signal and audio signal received from the overlay module 106.

The framebuffer module 108 is a module for receiving a forward of an updated video signal and audio signal from the surfaceflinger module 107 and again forwarding the video signal and audio signal to the overlay module 106.

The HDMI driver module 109 is a module for receiving a forward of a video signal and audio signal from the overlay module 106 and controlling the HDMI transmitter module 110. In detail, the HDMI driver module 109 is a module for controlling the HDMI transmitter module 110, which receives a forward of a video signal and audio signal from the HDMI driver module 109 and changes the received video signal and audio signal into an HDMI signal.

The HDMI transmitter module 110 is a module for changing a video signal and audio signal received from the HDMI driver module 109 into an HDMI signal, under the control of the HDMI driver module 109. For example, the HDMI transmitter module 110 is a module for transmitting a video signal and audio signal, desired by a user, as an HDMI signal to the broadcasting receiver 113, and for changing the video signal and audio signal received from the HDMI driver module 109 into the HDMI signal.

The MHL module 101 is not only a module for receiving a forward of an input signal input by a user from the broadcasting receiver 113 but also is a module for receiving a forward of HDMI data from the HDMI transmitter module 110, for converting the HDMI data into a Universal Serial Bus (USB) signal, and for forwarding the USB signal to the broadcasting receiver 113. Because the portable electronic terminal and the broadcasting receiver 113 of the TV are different in terminal size, both devices (i.e., the portable electronic terminal and the broadcasting receiver 113) cannot simply be connected with each other. So, the portable electronic terminal and the broadcasting receiver 113 can connect with each other by means of the MHL adapter 111 and the HDMI cable 112, thereby achieving bi-directional communication. According to exemplary embodiments of the present invention, the reason why the MHL module 101 converts the HDMI data into the USB signal is for forwarding the USB signal to the MHL adapter 111.

The MHL adapter 111 is a module for receiving a forward of a USB signal from the MHL module 101 and for converting the received USB signal into an HDMI signal. As described above, the MHL adapter 111 is a module for enabling free communication between the portable electronic terminal and the broadcasting receiver 113 each having a different terminal size.

The HDMI cable 112 is a module for receiving a forward of an HDMI signal from the MHL adapter 111, and for forwarding the received HDMI signal to the broadcasting receiver 113. As described above, the portable electronic terminal and the broadcasting receiver 113 of the television are different in terminal size, so the both devices are connected with each other by means of the HDMI cable 112.

According to exemplary embodiments of the present invention, the broadcasting receiver 113 of the television can receive a forward of an input signal from a user, forward the received input signal to the portable electronic terminal, receive a forward of an HDMI signal from the portable electronic terminal, and simultaneously display a dual video on a display unit. Consequently, according to exemplary embodiments of the present invention, the broadcasting receiver 113 can control an output screen desired by the user itself, and display the output screen on the television.

Figure 2:
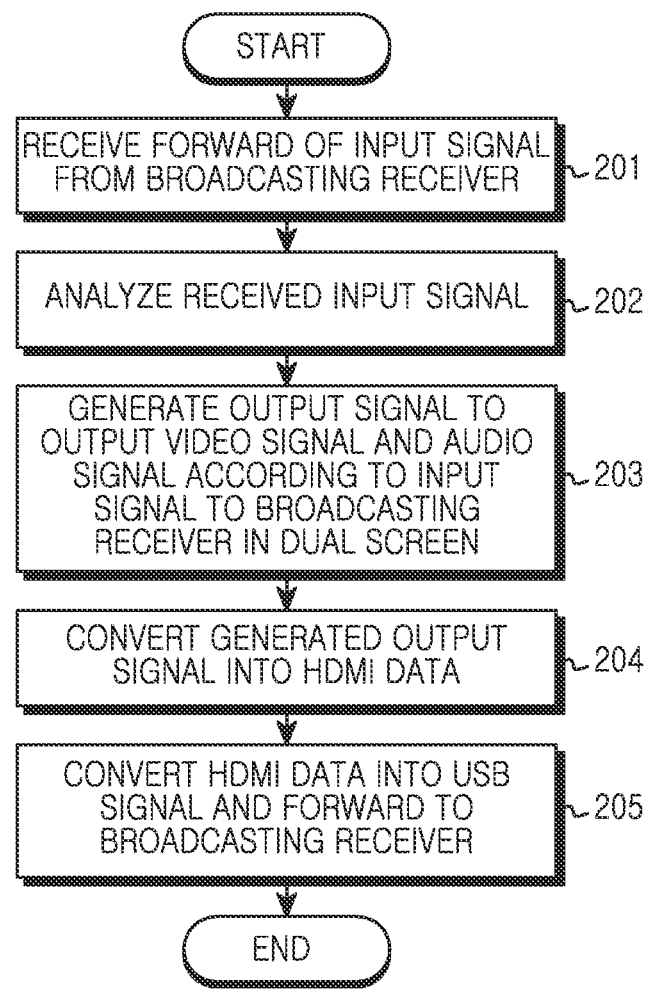
FIG. 2 is a flowchart illustrating an operation of a portable electronic terminal as an HDMI transmitter according to an exemplary embodiment of the present invention.

FIG. 2 is a flowchart illustrating an operation of a portable electronic terminal as a HDMI transmitter according to an exemplary embodiment of the present invention.

Referring to FIG. 1 and FIG. 2, the portable electronic terminal receives a forward of an input signal from a broadcasting receiver 113 of a television at step 201. In detail, if the broadcasting receiver 113 receives an input of an input signal from a user and forwards the received input signal to the portable electronic terminal, an MHL module 101 of the portable electronic terminal receives a forward of the input signal of the user from the broadcasting receiver 113. Because an MHL adapter 111 and an HDMI cable 112 are connected between the portable electronic terminal and the broadcasting receiver 113, the input signal output from the broadcasting receiver 113 is forwarded to the MHL adapter 111 through the HDMI cable 112, and the MHL adapter 112 transmits the input signal to the MHL module 101 of the portable electronic terminal. The aforementioned input signal refers to a signal that is input to the broadcasting receiver 113 by the user. For example, if the user sets to simultaneously display Internet search and sports relay on the broadcasting receiver 113 using a mouse, a remote controller and the like, a set signal is defined as an input signal. Here, a process in which the portable electronic terminal receives a forward of an input signal from the broadcasting receiver 113 uses Inter Integrated Circuit (I2C) communication. The I2C communication refers to a communication scheme of serially transmitting data through two lines of a clock line and a data line. According to exemplary embodiments of the present invention, the process in which the portable electronic terminal receives the forward of the input signal from the broadcasting receiver 113 as described above is possible to forward a large amount of information using the I2C communication.

If the portable electronic terminal receives a forward of an input signal from the broadcasting receiver 113, the portable electronic terminal analyzes the received input signal at step 202. In detail, an MHL driver module 102 of the portable electronic terminal receives a forward of an input signal from an MHL module 101 and controls the received input signal. The input signal controlled by the MHL driver module 102 is forwarded to a touch driver module 103, and the touch driver module 103 receives a forward of the controlled input signal from the MHL driver module 102 and selects an optimized module according to the user's input signal. For example, if a user selects a moving picture, the touch driver module 103 analyzes an input signal as a signal corresponding to displaying the moving picture, to select a module optimized to the moving picture. If the touch driver module 103 analyzes the input signal, the touch driver module 103 selects a user clip module 104 optimized to the input signal. Desirably, at least one or more user clip modules can be constructed plurally. For example, if the touch driver module 103 analyzes the user's input signal as an input signal corresponding to displaying a movie, the touch driver module 103 can select a movie clip module among a plurality of user clip modules. If the touch driver module 103 analyzes the user's input signal as an input signal playing a sound source, the touch driver module 103 can select a music clip module among the plurality of user clip modules. If the touch driver module 103 analyzes the user's input signal and selects an optimal user clip module according to the input signal, the selected user clip module 104 encodes a video signal and a audio signal, and encrypts the encoded signal by DRM. After that, the multimedia framework module receives a forward of the encrypted signal from the user clip module 104, decrypts the encrypted signal, and decodes the decrypted signal. The decrypted and decoded signal is forwarded to an overlay module 106. The overlay module 106 receives a forward of the decoded video signal and audio signal from the multimedia framework module, and forwards the video signal and audio signal, which can be output to the broadcasting receiver 113, to a surfaceflinger module 107. The surfaceflinger module 107 receiving the forward of the video signal and audio signal from the overlay module 106 forwards the received video signal and audio signal to the framebuffer module 108, together with a previously stored video signal and audio signal. After that, the framebuffer module 108 receives a forward of the updated video signal and audio signal from the surfaceflinger module 107, and again forwards the updated video signal and audio signal to the overlay module 106.

After that, the overlay module 106 generates an output signal to output the video signal and audio signal according to the input signal to the broadcasting receiver 113 in a dual screen at step 203. In detail, the overlay module 106 receiving the forward of the updated video signal and audio signal from the framebuffer module 108 adds all screen constructions to output to the broadcasting receiver 113 and forwards the screen constructions to an HDMI driver module 109. For example, the overlay module 106 outputs both the video signal and the audio signal to the HDMI driver module 109 to output to the broadcasting receiver 113 in the dual screen.

The HDMI transmitter module 110 converts the generated output signal into HDMI data at step 204. In detail, the HDMI transmitter module 110 receiving a forward of the video signal and audio signal to output to the broadcasting receiver 113 in the dual screen converts the video signal and audio signal into HDMI data and forwards the HDMI data to the MHL module 101. Here, the HDMI is a scheme of simultaneously forwarding a video signal and audio signal of a digital scheme by one cable. The HDMI refers to a scheme of, in a case where a player device and an output device all have HDMI terminals, simultaneously providing a video and an audio simply and conveniently, if only one HDMI cable is connected. Also, because the HDMI is a digital scheme of no quality deterioration, even a picture quality and an audio quality are very excellent, so even a full High-Definition (HD) video and a 7.1-channel sound can be transmitted through just only one cable. As the HDMI is applied to various devices such as a Personal Computer (PC), a Digital Versatile Disk (DVD) player, a Blu-ray player, a digital television, a video game machine, a multimedia player and the like, a range of use increases owing to this merit. Accordingly, exemplary embodiments of the present invention have an advantage of being capable of providing a video and audio signal of a high quality to the broadcasting receiver 113.

The MHL module 101 receiving a forward of the HDMI data from the HDMI transmitter module 110 converts the HDMI data into a USB signal and forwards the USB signal to the broadcasting receiver 113 at step 205. In detail, because the portable electron terminal and the broadcasting receiver 113 are different in terminal size, as described above, the MHL adapter 111 and the HDMI cable 112 are connected between the portable electronic terminal and the broadcasting receiver 113. Accordingly, because the MHL module 101 of the portable electronic terminal fails to just forward the HDMI data to the broadcasting receiver 113, the MHL module 101 converts the HDMI data received from the HDMI transmitter module 110 into the USB signal. After the MHL module 101 converts the HDMI data into the USB signal, the MHL adapter 111 receives a forward of the USB signal and again converts the USB signal into an HDMI signal. The converted HDMI signal is forwarded to the broadcasting receiver 113 through the HDMI cable 112. As described above, the USB signal forwarded from the portable electronic terminal to the broadcasting receiver 113 is forwarded through I2C communication.

Figure 3:
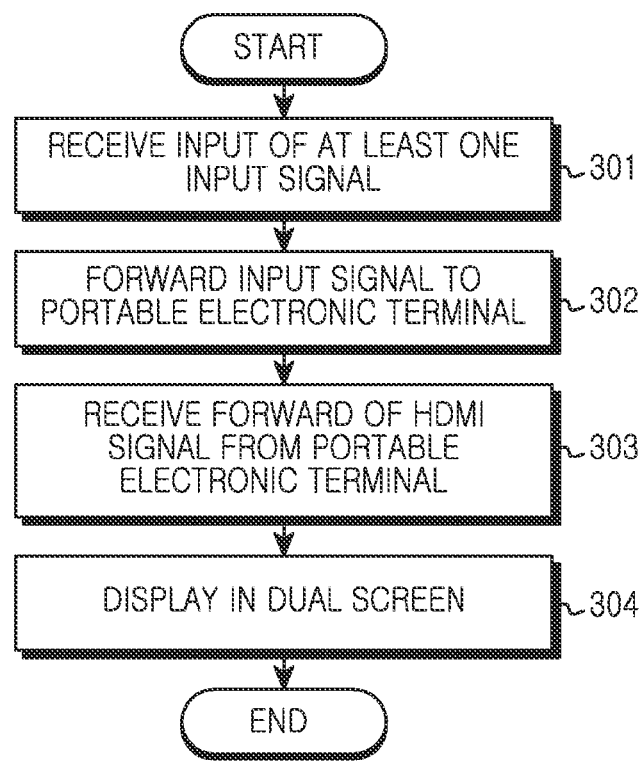
FIG. 3 is a flowchart illustrating an operation in a broadcasting receiver of a television as a HDMI receiver according to an exemplary embodiment of the present invention.

FIG. 3 is a flowchart illustrating an operation in a broadcasting receiver of a television as a HDMI receiver according to an exemplary embodiment of the present invention. First, the broadcasting receiver 113 in FIG. 1 according to exemplary embodiments of the present invention is premised on a broadcasting receiver of not providing a function of connecting with a Web browser and simultaneously displaying the Internet and broadcasting reception.

Referring to FIG. 3, the broadcasting receiver 113 receives an input of at least one input signal at step 301. In detail, the broadcasting receiver 113 receives a forward of a plurality of input signals to be displayed on the broadcasting receiver 113, from a user. The aforementioned input signal refers to a signal that is input to the broadcasting receiver 113 by the user. For example, if the user sets to simultaneously display Internet search and sports relay on the broadcasting receiver 113 using a mouse, a remote controller and the like, a set signal is defined as an input signal.

After receiving the input of at least one input signal from the user, the broadcasting receiver 113 forwards the input signal to the portable electronic terminal at step 302. In detail, as shown in FIG. 1, because an HDMI cable 112 and an MHL adapter 111 are connected between the broadcasting receiver 113 and the portable electronic terminal, the broadcasting receiver 113 forwards the input signal to the MHL adapter 111 through the HDMI cable 112, and the MHL adapter 111 forwards the received signal to the MHL module 101 of the portable electronic terminal. As described above, the reason of connecting the HDMI cable 112 and the MHL adapter 111 between the broadcasting receiver 113 and the portable electronic terminal is that the portable electronic terminal and the broadcasting receiver 113 are different in terminal size. Also, when the input signal is forwarded from the broadcasting receiver 113 to the portable electronic terminal, the forwarded input signal uses I2C communication.

After that, the broadcasting receiver 113 receives a forward of an HDMI signal from the portable electronic terminal at step 303. In detail, a USB signal forwarded from the MHL module 101 of the portable electronic terminal is changed into the HDMI signal in the MHL adapter 111, and the changed HDMI signal is forwarded to the broadcasting receiver 113 through the HDMI cable 112. Also, as described above, when the input signal is forwarded from the broadcasting receiver 113 to the portable electronic terminal, the forwarded input signal uses the I2C communication.

The broadcasting receiver 113 receiving the forward of the HDMI signal from the portable electronic terminal displays an output signal according to a user's input signal on a display unit of the broadcasting receiver 113 in a dual screen at step 304. In detail, the related art provides only a function of displaying a screen, which is being displayed on the portable electronic terminal, on the broadcasting receiver 113 as one screen as it is, however, exemplary embodiments of the present invention have an advantage of being capable of displaying a plurality of screens desired by a user on the broadcasting receiver 113, irrespective of a screen that is being displayed on the portable electronic terminal.

Figure 4:
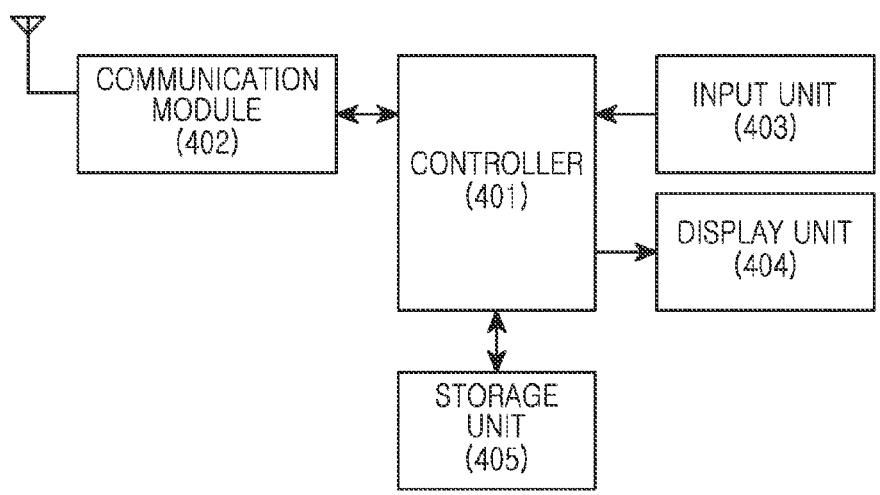
FIG. 4 is a block diagram illustrating a construction of a portable electronic terminal according to an exemplary embodiment of the present invention.

FIG. 4 is a block diagram illustrating a construction of a portable electronic terminal according to an exemplary embodiment of the present invention.

Referring to FIG. 4, the portable electronic terminal can include a controller 401, a communication module 402, an input unit 403, a display unit 404, and a storage unit 405.

The controller 401 controls the general operation of the portable electronic terminal. According to exemplary embodiments of the present invention, as shown in FIG. 1, the controller 401 can include an MHL module 101, an MHL driver module 102, a touch driver module 103, a user clip module 104, a multimedia framework module 105, an overlay module 106, a surfaceflinger module 107, a framebuffer module 108, an HDMI driver module 109, and an HDMI transmitter module 110. For example, the controller 401 analyzes an input signal received from a broadcasting receiver 113 in FIG. 1, and generates an output signal according to the input signal. Also, the MHL driver module 102 controls the received input signal and, according to the controlled input signal, the touch driver module 103 selects at least one of a video signal and an audio signal. Also, the user clip module 104 encodes the video signal and audio signal and encrypts the encoded signal by DRM. The multimedia framework module 105 decrypts the encrypted signal and decodes the decrypted signal. Also, the overlay module 106 generates at least one of the video signal and the audio signal to be output to the broadcasting receiver 113. The surfaceflinger module 107 updates at least one of the generated video signal and audio signal. Also, the framebuffer module 108 receives a forward of the updated signal from the surfaceflinger module 107 and forwards the updated signal to the overlay module 106. The HDMI driver module 109 receives a forward of an output signal from the overlay module 106 to output to the broadcasting receiver 113 in a dual screen. Also, the HDMI transmitter module 110 converts a generated output signal into HDMI data, and the MHL module 101 converts the HDMI data into a USB signal and forwards the USB signal to the broadcasting receiver 113.

The communication module 402 processes a signal transmitted/received through an antenna for voice and data communication. For example, the communication module 402 receives a forward of at least one input signal from the broadcasting receiver 113, and transmits an output signal to the broadcasting receiver 113 so that the broadcasting receiver 113 can output the output signal.

The input unit 403 provides input data generated by user's selection, to the controller 401.

The display unit 404 displays status information of the portable electronic terminal, menu screen and story information according to the control of the controller 401. In fact, it is within the spirit and scope of the presently claimed invention that the input unit 403 and display unit 404 could all be served by a single touch screen. That is, a touch sensitive display, called as a touch screen, may be used as the display unit 404. In this situation, touch input may be performed via the touch sensitive display.

The storage unit 405 can include a program storage unit and a data storage unit. The program storage unit stores a program for controlling an operation of the portable electronic terminal. The data storage unit stores data generated in execution of a program.

In the aforementioned construction, the controller 401 can perform the general function of the portable electronic terminal. According to exemplary embodiments of the present invention, construction can be such that the controller 401 can process all of the functions of the terminal, or construction can be such that the controller 401 can process only some of the functions.

The method described above in relation with FIG. 2 under of the present invention may be provided as one or more instructions in one or more software modules stored in the storage unit 405. The software modules may be executed by the controller 401.

According to the present invention, for example, an electronic device comprising one or more controller, the touch input device as the display unit 404, the storage unit 405 and one or software modules stored in the memory configured for execution by the controller 401, the software modules comprising one or more instruction to perform methods described through the specification as above or hereunder.

Figure 5:
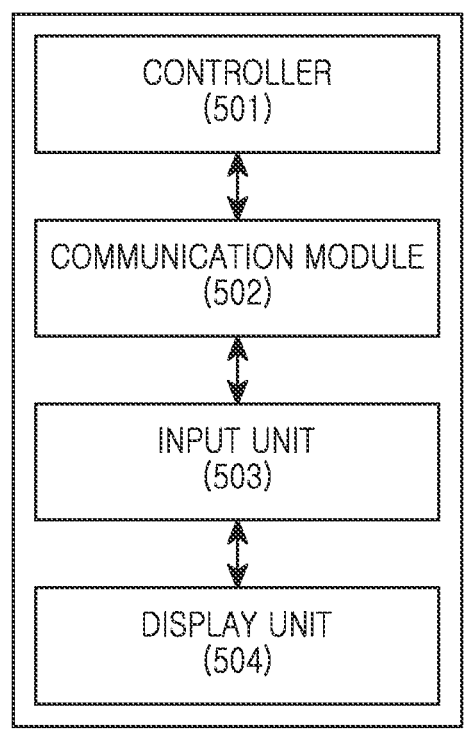
FIG. 5 is a block diagram illustrating a construction of a broadcasting receiver according to an exemplary embodiment of the present invention.

FIG. 5 is a block diagram illustrating a construction of a broadcasting receiver according to an exemplary embodiment of the present invention.

Referring to FIG. 5, the broadcasting receiver 113 in FIG. 1 can include a controller 501, a communication module 502, an input unit 503, and a display unit 504.

The controller 501 controls the general operation of the broadcasting receiver 113.

The communication module 502 processes a signal transmitted/received for voice and data communication. For example, the communication module 502 forwards an input signal to a portable electronic terminal, and receives a forward of an HDMI signal from the portable electronic terminal.

The input unit 503 receives an input of input data generated by user's selection. For example, the input unit 503 receives an input of at least one input signal from a user.

The display unit 504 displays status information of the broadcasting receiver 113, menu screen and story information. For example, the display unit 504 receives a forward of an HDMI signal and outputs the HDMI signal in a dual screen.

In the aforementioned construction, the controller 501 can perform the general function of the broadcasting receiver. According to exemplary embodiments of the present invention, construction can be such that the controller 501 can process all of the functions of the broadcasting receiver 113, or construction can be such that the controller 501 can process only some of the functions.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable recording mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An operation method of a portable electronic terminal, the method comprising:
   receiving at least one input signal from a broadcasting receiver;
   selecting at least one of a plurality of multimedia contents corresponding to the received input signal;
   processing the selected contents to an output signal;
   generating the output signal based on the received input signal; and
   transmitting the output signal to the broadcasting receiver so that the output signal can be output from the broadcasting receiver,
   wherein the processing of the selected contents to the output signal further comprises:
   updating the selected contents using a previously stored contents;
   constructing at least a first overlay and a second overlay corresponding to the selected updated contents so that the output signal can be output in a dual screen mode to the broadcasting receiver; and
   outputting the updated contents as the output signal, and
   wherein the transmitting of the output signal to the broadcasting receiver comprises:
   converting the generated output signal into High Definition Multimedia Interface (HDMI) data;
   converting the HDMI data into a Universal Serial Bus (USB) signal; and
   forwarding the USB signal to the broadcasting receiver.

2. The method of claim 1, wherein the input signal comprises a signal that is input to the broadcasting receiver by a user.

3. The method of claim 1, wherein the receiving of the at least one input signal comprises analyzing the received input signal.

4. The method of claim 1,
   wherein the processing of the selected contents comprises:
   encoding the selected contents;
   encrypting the encoded contents by Digital Rights Management (DRM);
   decrypting the encrypted contents; and
   decoding the decrypted contents.

5. The method of claim 1, wherein the signal transmitting/receiving operation between the portable electronic terminal and the broadcasting receiver is performed in an Inter Integrated Circuit (I2C) communication scheme.

6. An apparatus of a portable electronic terminal, the apparatus comprising:
   a controller configured to analyze an input signal received from a broadcasting receiver, and to generate an output signal based on the received input signal, wherein the controller comprises:
   a first driver configured to receive the received input signal;
   a second driver configured to analyze the received input signal, to select at least one of a plurality of multimedia contents corresponding to the received input signal; and
   a processor configured to process the selected contents and to output the output signal so that the output signal can be output in a dual screen to the broadcasting receiver, wherein the processor comprises:
   a surfaceflinger module configured to receive the selected contents and update the selected contents using a previously stored contents;
   a framebuffer module configured to receive the updated contents; and
   an overlay module configured to receive the updated contents from the framebuffer module and to construct at least a first overlay and a second overlay corresponding to the selected contents; and
   a communication module configured to receive at least one input signal from the broadcasting receiver, and to transmit the output signal to the broadcasting receiver so that the output signal can be output from the broadcasting receiver,
   wherein the communication module comprises:
   a High Definition Multimedia Interface (HDMI) transmitter module configured to convert the output signal into HDMI data; and
   a Mobile High Definition Link (MHL) module configured to convert the HDMI data into a Universal Serial Bus (USB) signal; and to forward the USB signal to the broadcasting receiver.

7. The apparatus of claim 6, wherein the input signal comprises a signal that is input to the broadcasting receiver by a user.

8. The apparatus of claim 6, wherein the processor comprises:
   a user clip module configured to encode the selected contents, and to encrypt the encoded contents by Digital Rights Management (DRM); and
   a multimedia framework module to decrypt the encrypted contents, and to decode the decrypted contents.

9. The apparatus of claim 6, wherein the signal transmitting/receiving operation between the portable electronic terminal and the broadcasting receiver is performed in an Inter Integrated Circuit (I2C) communication scheme.

* * * * *